May 27, 1969   H. SIEBOLD ET AL   3,446,072
MONITORING APPARATUS FOR A METER REGISTER
Filed April 6, 1967   Sheet 1 of 4
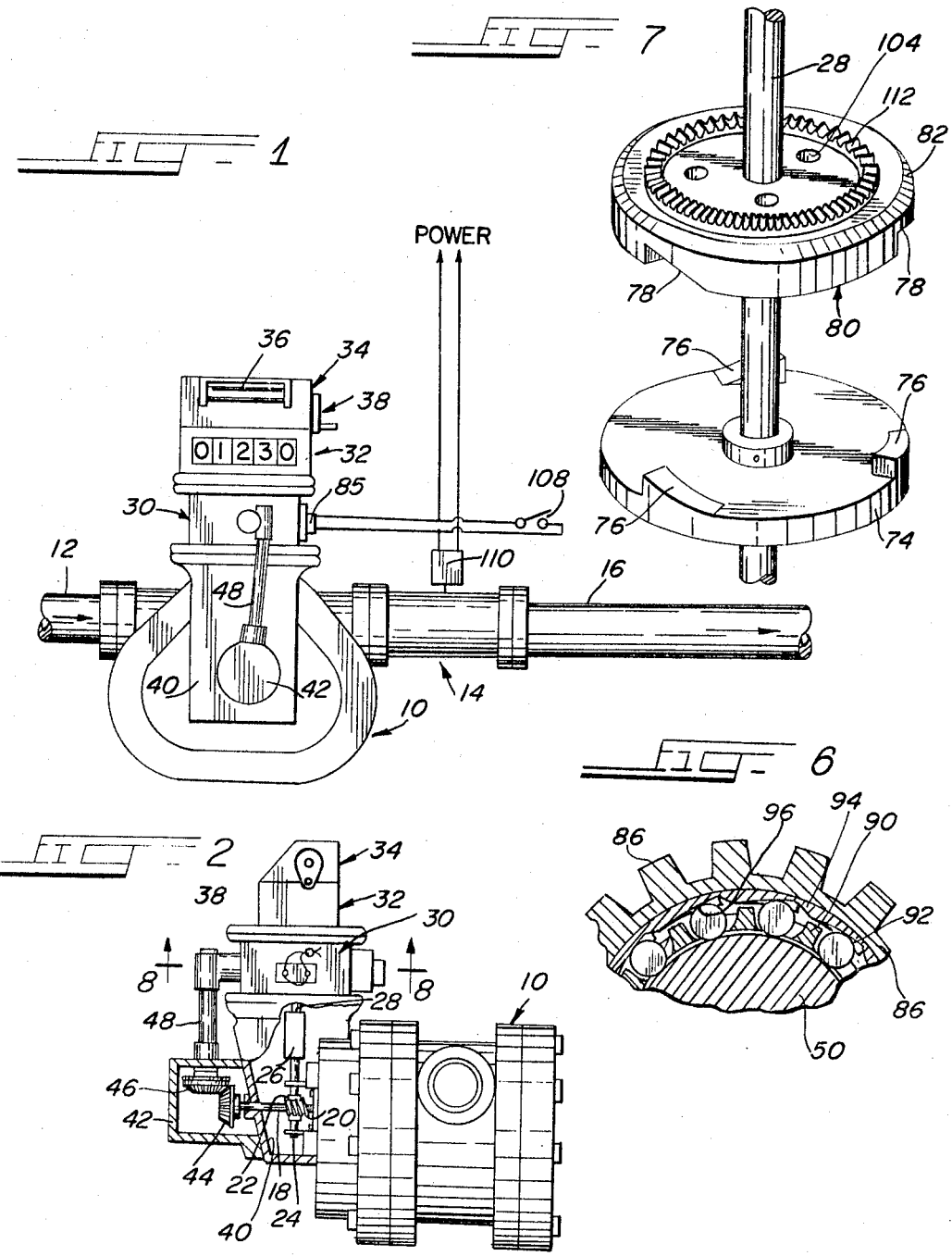
INVENTORS
HOWARD SIEBOLD
GILBERT R. DOUGLAS
BY Fidler, Bradley & Patnaude
ATTYS

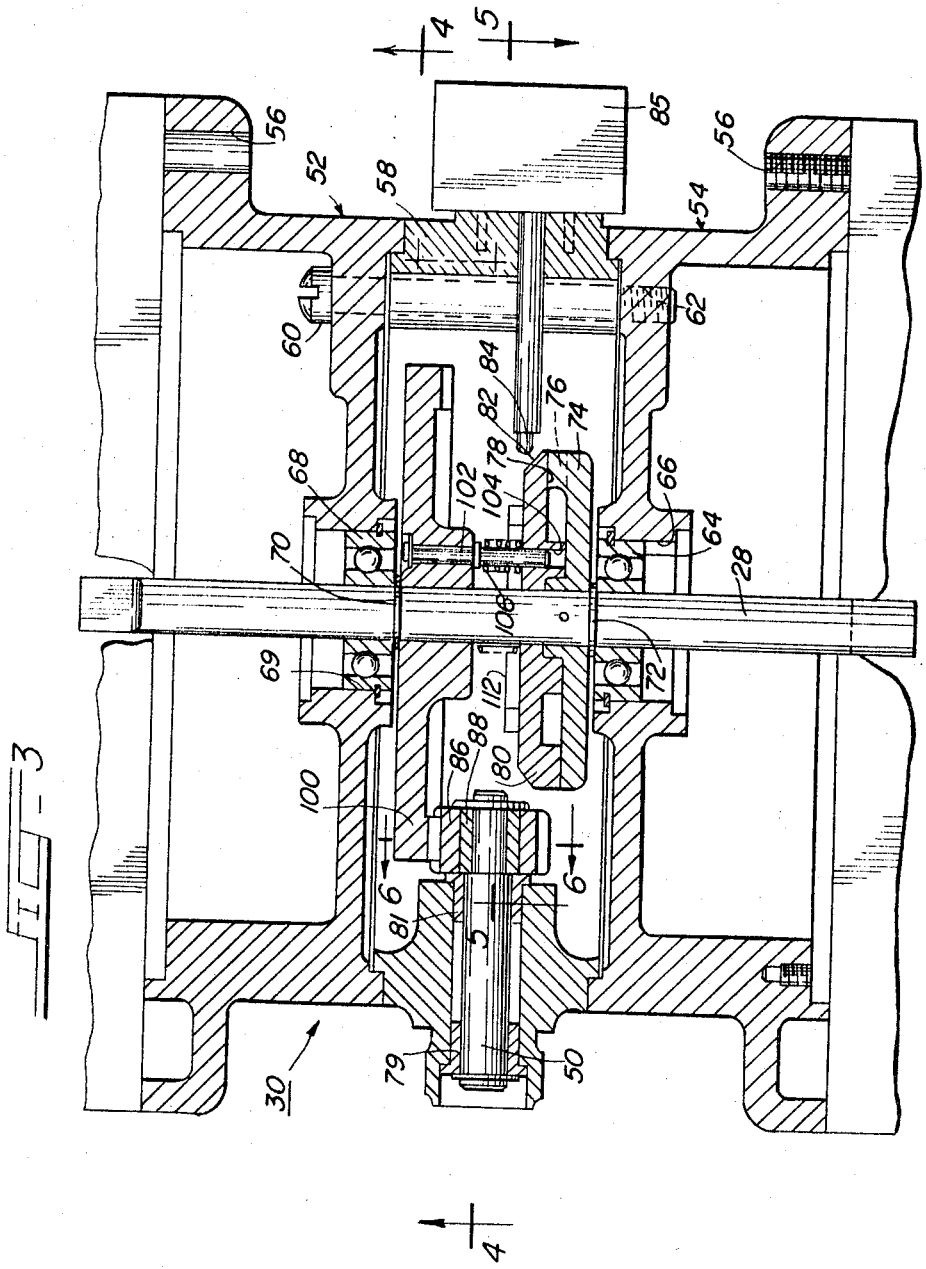

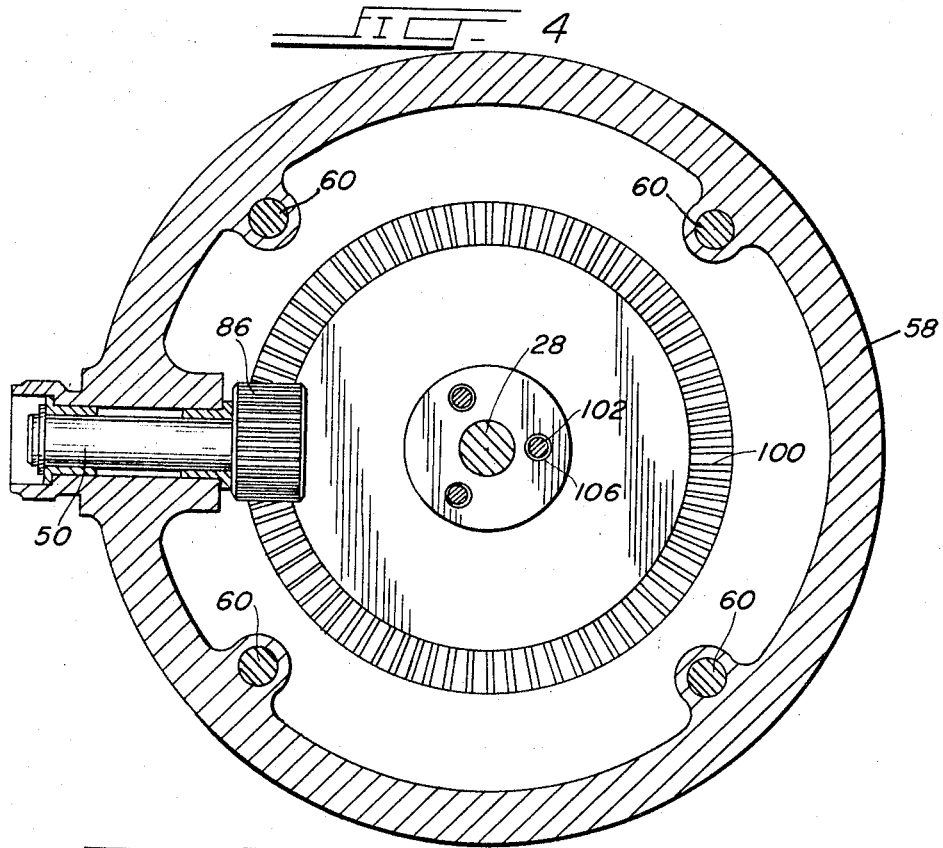
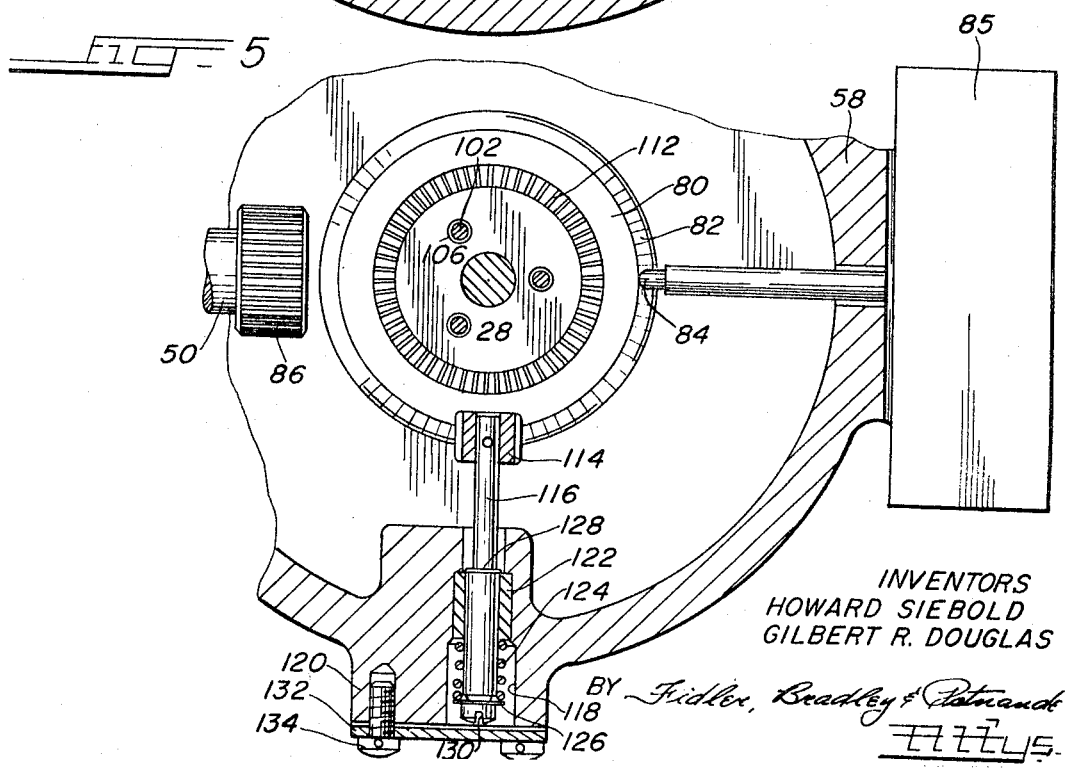

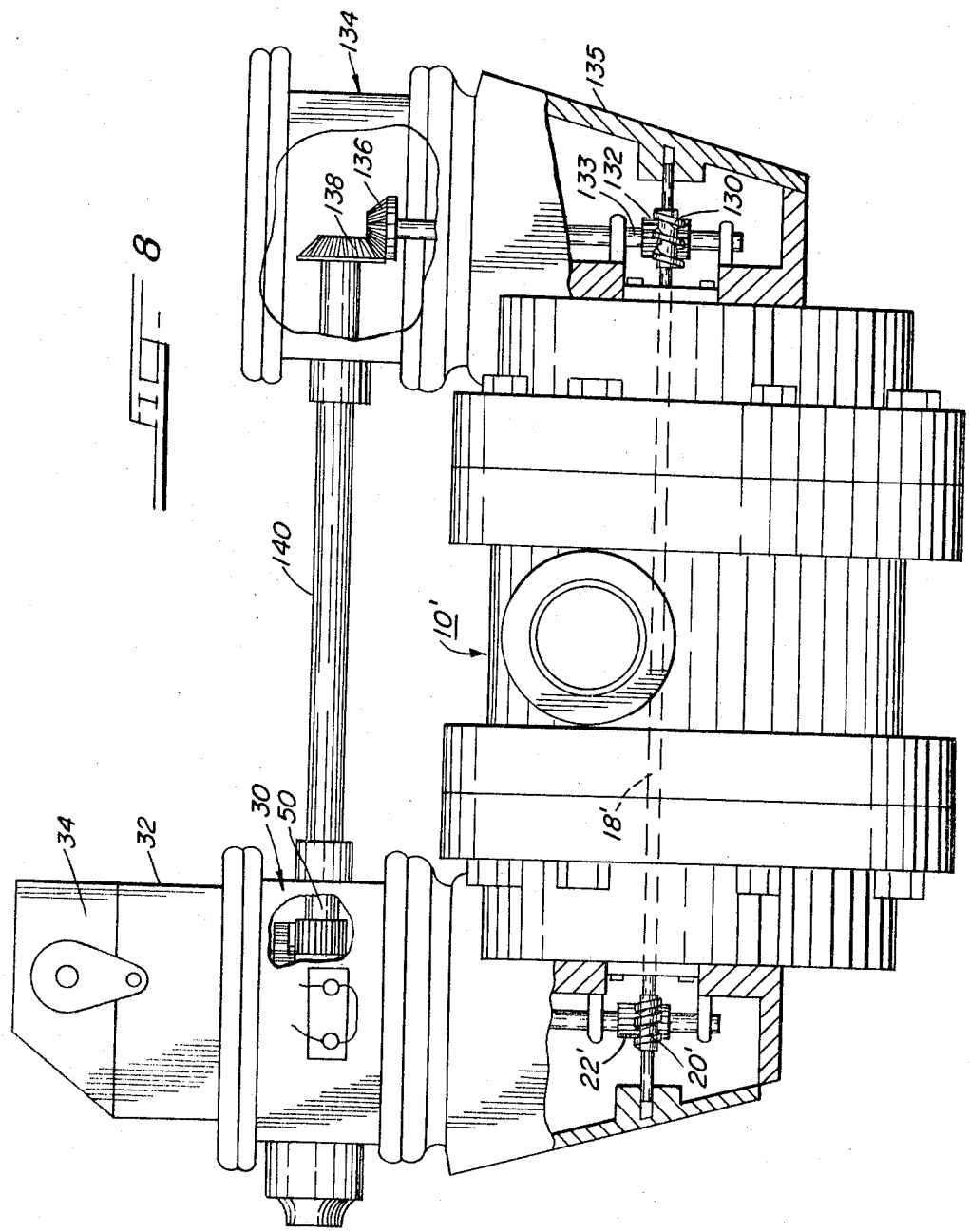

United States Patent Office 3,446,072
Patented May 27, 1969

---

3,446,072
MONITORING APPARATUS FOR A METER REGISTER
Howard Siebold, Libertyville, and Gilbert R. Douglas, Waukegan, Ill., assignors to Liquid Controls Corporation, Chicago, Ill., a corporation of Illinois
Filed Apr. 6, 1967, Ser. No. 629,030
Int. Cl. G01f 1/02
U.S. Cl. 73—198
8 Claims

ABSTRACT OF THE DISCLOSURE

Monitoring apparatus includes a solenoid operated line valve which is automatically closed when the speed of the meter output shaft is proportionally greater than the speed of a register input shaft driven by the meter.

---

The present invention relates to apparatus for monitoring the operation of a register which is driven by a meter, and it relates more particularly to a system for automatically interrupting the flow of fluid in a line in the event that the register is jammed or its operation retarded either accidentally or intentionally to cause it to register a lesser amount than that actually passing through the meter.

In dispensing fluids as, for example, liquid fuels, it is common practice to connect a register or counter to a meter provided in the supply line to record the quantity of fuel which is dispensed. Where such systems are unattended, it is the usual practice to provide a printer as an adjunct to the register for making a printed record on a ticket or slip of the amount indicated by the register. Unfortunately, unscrupulous persons have found ways of temporarily jamming or retarding the operation of the register without actually interfering with the operation of the meter. As a result, such persons have been able to obtain substantially larger amounts of fuel than that for which they are charged.

Therefore, a principal object of the present invention is to provide new and improved apparatus for interrupting the flow of fluid in a line when the rate of flow therein is greater than the rate being registered.

Another object of the present invention is to provide a new and improved comparator device adapted to be interconnected between the output shaft of a meter and an associated counter or register which is responsive to a change in the relative rotation of the operating parts of the meter and the register.

Further objects and advantages and a better understanding of the present invention may be had by reference to the following detailed description taken in connection with the accompanying drawings, wherein:

FIGURE 1 is a front elevational view, partly schematic, of a fluid metering system embodying the present invention;

FIGURE 2 is a side elevational view of the system of FIG. 1, with portions of the housing broken away to show the interior operating mechanisms thereof;

FIGURE 3 is a cross-sectional view of a comparator device embodying the present invention and adapted to be incorporated in the system of FIG. 1;

FIGURE 4 is a cross-sectional view taken along the line 4—4 of FIG. 3, assuming the entire device to be shown therein;

FIGURE 5 is a cross-sectional view taken along the line 5—5 of FIG. 3, assuming the entire device to be shown therein;

FIGURE 6 is a fragmentary, cross-sectional view taken along the line 6—6 of FIG. 3, assuming the entire device to be shown therein; and particularly showing the over-running clutch mechanism;

FIGURE 7 is an exploded isometric view of the ratchet wheel mechanism of the comparator of FIG. 3; and FIGURE 8 is a side elevational view with portions of the housing broken away of an alternative embodiment of the present invention.

Referring now to the drawings, and particularly to FIGS. 1 and 2 thereof, there is shown a fluid meter 10 of the rotary positive displacement type such as shown, for example, in United States Patent 2,835,229 to George B. Richards. It will be understood, however, that any suitable type of meter having a shaft driven at a speed proportional to the rate of fluid flow through the meter may be employed.

The fluid to be metered is supplied to the inlet port of the meter 10 through a conduit 12 and the metered fluid passes from the outlet port of the meter 10 through a suitable solenoid operated cutoff valve 14 to a conduit 16 from which it may be dispensed or supplied to another location in the system. The meter 10 is provided with an output shaft 18 which rotates at a speed proportional to the rate of flow of fluid through the meter. A drive worm 20 is fixedly mounted on the shaft 18 and drives a worm gear 22 mounted on a vertical shaft 24 suitably journaled as shown, for example, in the above-identified Richards patent. The shaft 24 is connected to and drives a conventional adjuster 26 which enables fine adjustment of the drive ratio between the meter and the output from the adjuster 26 during calibration of the system. As is well known in the art, the adjuster output is ordinarily used to drive a counter or register.

The adjuster 26 may be similar in construction to that disclosed in United States Patent 2,868,038 to H. R. Billeter. The output connector (not shown) of the adjuster 26 is directly connected to a vertical shaft 28 of a comparator device 30, best shown in FIG. 3, which shaft is directly connected to the input of a counter or register 32. The shaft 28 thus provides a direct drive connection between the adjuster 26 and the counter 32. In applications where an adjuster is unnecessary, the shaft 24 is coupled directly to the comparator shaft 28.

As shown, in FIGS. 1 and 2, the counter 32 is mounted directly on the comparator 30 and a printer unit 34 is mounted directly on and driven by the counter 32. The printer 34 has a slot 36 into which the record member may be inserted for printing thereon the total indicated by the register 32 when the handle 38 is rotated. The printer 34 may be of any suitable construction for printing the total registered by the counter on a ticket, card, or other record member, but preferably, the counter 32 and the printer 34 are a combined unit as sold by Veeder-Root, Inc., of Hartford, Conn., under the name "Master Meter Duplicator" Model KD–LB (Series 151800).

The output shaft 18 of the meter 10 extends outwardly beyond the worm 20 through a suitable bushing provided in a housing wall 40 and into an auxiliary housing 42 which is fixedly mounted as, for example, by welding or by sealable bolts to the wall 40. A bevel gear 44 is fixed on the end of the shaft 18 and mates with a suitably journaled bevel gear 46 which is connected by a suitable flexible cable drive to an input shaft 50 extending through the side wall of the comparator 30. In order to prevent tampering with the cable, it is housed in a rigid conduit 48 connected between the housing 42 and the housing of the comparator 30. It will be understood that the various housing parts of the system are suitably bolted and connected in the usual manner by sealing wires and associated seals whereby unauthorized entry or disassembly of the equipment is guarded against.

Comparator device 30

Referring to FIG. 3, it may be seen that the comparator 30 comprises an upper adapter plate 52 and a lower adapter plate 54. The adapter plates 52 and 54, which may be metal castings, are generally cup-shaped and are provided with a plurality of suitable mounting holes 56 in annular mounting flanges for bolting the device 30 respectively to the meter 10 and to the register 32. An intermediate housing member 58, which is also annular, and which may be cast of any suitable metal such, for example, as aluminum, is mounted between the adapter plates 52 and 54 and the entire assembly is held together by a plurality of screws 60 which extend through aligned holes in the web portions of the adapter plates 52 and 54 and the intermediate housing member 58. As shown, the holes 62 in the lower plate 54 are tapped to threadedly receive the screws 60 whose heads are located within the central recess in the upper adapter plate 52.

As heretofore described, the output side of the adjuster 26 is directly connected to the input of the counter 32 by the shaft 28 which is mounted in and extends entirely through the comparator device 30. Hence, a direct drive from the adjuster 26 to the counter 32 is provided and the speed of rotation of the shaft 28 is directly proportional to the rate of operation of the counter 32. Consequently, if the counter 32 is jammed or its operaion retarded, the shaft 28 stops or slows down accordingly.

As shown in FIG. 3, the shaft 28 is journaled in a lower ballbearing 64 suitably mounted in an aperture 66 located along the central axis of the lower adapter plate 54. A similar ballbearing 68 is mounted in a central recess 69 in the upper adapter plate 52 and provides the upper journal support for the shaft 28. The shaft 28 is held in a relatively fixed vertical position by means of a pair of upper and lower retaining rings 70 and 72 which are snap-fitted into annular grooves in the shaft 28 directly below and above, respectively, the bearings 68 and 64.

A ratchet wheel 74 is disposed above the retaining ring 72 and suitably pinned to the shaft 28 so as to rotate in unison therewith. As best shown in FIG. 7, a plurality of camming lugs 76 are provided on the upper peripheral surface of the ratchet wheel 74 and provide upwardly sloping cam surfaces which mate with corresponding downwardly facing tapered recesses 78 on a driven ratchet wheel 80 loosely mounted on the shaft 28. During normal operation of the system the shaft 28 rotates in a counterclockwise direction as viewed from the bottom of FIG. 3. Should, however, the ratchet wheel 74 rotate in a clockwise direction relative to the ratchet wheel 80, the camming lugs 76 ride out of the recesses 78 and push the ratchet wheel 80 in an upward direction causing the chamfered peripheral edge 82 thereof to engage and depress an actuating finger 84 suitably connected to an electric switch 85. As is more fully described hereinafter, depression of the finger 84 opens the normally closed switch 85 to cause the valve 14 to be closed. Interruption of the flow of fluid through the system thereby results.

In order to prevent the above-described relative rotation between the ratchet wheels 74 and 80, unless the operation of the counter is being retarded, the input shaft 50, which extends through a pair of bushings 79 and 81 mounted in a radial hole in the wall of the intermediate housing member 58, is drivingly connected to the ratchet wheel 80 so as to drive it in a counterclockwise direction at a speed which approximates but does not exceed that of the ratchet 74 during normal operation. If, however, the rotation of the main connector shaft 28 is retarded, then, of course, the ratchet 74 being pinned thereto will also be slowed down to a speed of rotation less than that of the ratchet wheel 80 thereby to push the ratchet wheel 80 into the upward switch engaging position.

Considered in greater detail, the shaft 50 is connected to a drive pinion 86 by means of an over-running clutch 88. The clutch 88 is best shown in FIG. 6 and includes a retainer ring 90 in which a plurality of needle bearings 92 are rotatably mounted for engagement with the shaft 50. A cam ring 94, press-fitted into a central bore in the pinion gear 86 overlies the bearings 92. Gradually tapered ramp surfaces 96 are provided on the interior surface of the cam ring 94 whereby counterclockwise rotation of the shaft 50 relative to the gear 86 moves the needles in a counterclockwise direction relative to the ramps 96 whereby the needles are prevented from rotating and thus provide a fixed drive connection between the shaft 50 and the pinion gear 86. If, on the other hand, the pinion gear 86 is driven in a counterclockwise direction relative to the shaft 50, the cam ring 94 moves counterclockwise relative to the needles 92. The needles are thus moved down the ramp surfaces 96 and are free to rotate, whereby the pinion gear 86 becomes disengaged from the shaft 50. Over-running clutches of this type are well known and may be purchased from the Torrington Company of Torrington, Conn., under Catalog No. RC–040708.

The pinion gear 86 mates with a face gear 100 which is freely rotatable on the shaft 28 beneath the retaining ring 70 and which is connected to the ratchet wheel 80 by means of a plurality of drive pins 102 fixedly mounted in the gear 100 in symmetrical relationship about the center thereof. The lower ends of the pins 102 are slidably received in suitable bores 104 in the ratchet wheel 80 and coil springs 106, which encircle the pins 102, are disposed between the lower face of the gear 100 and the upper face of the ratchet wheel 80 thereby to resiliently urge the lower face of the ratchet wheel 80 into engagement with the upper face of the ratchet wheel 74.

The gear ratios are selected such that during normal operation the ratchet wheel 80 is driven by the shaft 50 in a counterclockwise direction as viewed from the bottom of the unit at a slightly lesser speed than the ratchet wheel 74 is rotated by the shaft 28. Stated differently, during normal operation, the ratchet wheel 80 is actually driven by the ratchet wheel 74 inasmuch as the radial faces of the lugs 76 drive against the corresponding faces of the notches 78. If, however, the speed of rotation of the shaft 28 is retarded such that the ratchet wheel 80 is being driven by the shaft 50 at a speed exceeding that of the ratchet wheel 74, then the sloping cam surfaces on the lugs 76 and recesses 78 force the ratchet wheel 80 upwardly causing it to operate the switch 85 thereby to interrupt the operation of the system. As best shown in FIG. 5, once the ratchet lugs 76 have moved out of the recesses 78 onto the intermediate planar surfaces of the ratchet wheel 80, the axial force exerted by the springs 106 cannot move the ratchet wheel 80 out of the switch actuating position whereby the system remains inoperative until positive action is taken to reset it.

Reset mechanism

One means for restoring the comparator to an operative condition once the cause for retarding or stopping the shaft 28 has been eliminated is schematically illustrated in FIG. 1. In that system, a single throw single pole switch 108 connected in parallel with the switch 85, the latter switch being connected in series between a suitable source of power and a control solenoid which operates the valve 14. The switch 85 is spring biased in a closed position so that when it is actuated the energization circuit for the solenoid 110 is normally closed and the valve 14 is open. When, however, a counting error has been detected and the switch 85 has opened, the solenoid 110 is de-energized and the flow of fluid in the line is cut off.

By thereafter closing the switch 108, the solenoid 110 is once more energized to open the valve 14 to again permit flow of fluid through the system. The flow of fluid through the meter 10 rotates both the shaft 28 and the shaft 50 and since, under normal conditions, the ratchet wheel 74 rotates faster than the ratchet wheel 80, the ratchet lugs 76 soon become aligned with the recesses 78 in the ratchet member 80, whereby the member 80 is returned by the spring 106 to the non-switch actuating position. The comparator has been reset and the system can be restored to normal operation by opening the switch 108. Since the switch 108 over-rides the comparator, it is preferably located at a remote position as, for example, in an office so that the unscrupulous person who has jammed the system does not have access to it.

Another means for resetting the comparator is illustrated best in FIG. 5. As there shown, the ratchet wheel 80 has a face gear 112 integrally formed on the upper surface thereof. A reset pinion 114 is fixed to a shaft 116 which is journaled in a bore 118 provided in a boss 120 on the side of the intermediate housing member 58. A bearing sleeve 122 through which the shaft 116 is slidably disposed is mounted in a counterbore in the boss 120 and a coil spring 124 is positioned over the shaft 116 between the sleeve 122 and a retaining ring 126 secured to the shaft. As shown, a retaining ring 128 is fixed in a groove in the shaft 116 inwardly of the sleeve 122 to prevent removal of the shaft. A screwdriver slot 130 is provided in the end of the shaft 116 so that when a cover plate 132 has been removed by breaking a seal and removing a plurality of mounting screws 134, the shaft 116 may be pressed inwardly against the force of the spring 124 until the pinion 114 mates with the face gear 112. The screwdriver which has been used to press the shaft 116 into the engaging position may now be rotated to rotate the cam member 80 in a counterclockwise direction until the recesses 78 therein are aligned with the ratchet lugs 76. The comparator 30 is then again in normal operating condition. However, inasmuch as the seal for the reset mechanism has been broken, it is visually apparent that the unit has required resetting and proper investigation can be made.

Referring to FIG. 8 there is shown an alternative embodiment of the present invention. As there shown, the output shaft 18′ of the meter 10′ extends outwardly from both sides of the meter. On the left-hand side is mounted a worm 20′ mating with a worm gear 22′ which may be connected through an adjuster (not shown) to the shaft 28 of the comparator device 30 which is in turn connected to a counter 32 and a printer 34. A worm 130 is connected to the opposite or right-hand end of the meter output shaft and drives a worm gear 132 which is connected through a vertical shaft 133 to a right angle drive unit 134 mounted on the right-hand auxiliary housing 135. As shown, the right angle drive unit 134 may comprise a pair of mating bevel gears 136 and 138 with the latter gear being suitably connected through a flexible or other coupling, mounted within a protective conduit 140, to the input shaft 50 of the comparator device 30. In other respects the system of FIG. 8 operates the same as that previously described. However, it has the advantage that it is more readily adaptable to some installations.

It will thus be seen that the monitoring system of the present invention not only prevents unrecorded flow of fluid in the associated line but it also provides a positive indication when the counter has been retarded. In the preferred embodiment wherein the signal obtained directly from the output shaft of the meter is compared mechanically with the signal obtained at the counter, repairs can be made in the field where electronic technicians are not readily available. Moreover, dispensing systems which were previously in use can be modified in the field to incorporate the monitoring system of this invention.

Normally, the adjuster 26 enables an adjustment of five percent and, therefore, it has been found desirable to employ a speed ratio between the shaft 24 and the ratchet wheel 80 of 1.06 to 1.00. This ratio permits full use of the adjuster 26 without the ratchet wheel 74 reaching the speed of the ratchet wheel 80 during normal operation. Since the adjuster is usually set near the middle of its range of adjustment, in such cases the comparator will detect a decrease of about three percent in the speed of rotation of the shaft 28. With the adjuster 26 set at the low end of its range of adjustment a decrease of six percent will be detected and with the adjuster 26 set at the high end a decrease of one percent will be detected.

While the present invention has been described in connection with particular embodiments thereof it will be understood by those skilled in the art that many changes and modifications may be made without departing from the true spirit and scope of the invention. Therefore, it is intended in the appended claims to cover all such changes and modifications as fall within the true spirit and scope of the present invention.

We claim:
1. Control apparatus for monitoring the operation of a register which records the amount of fluid passing through a meter connected in a fluid line, said meter having an output shaft which rotates at a speed proportional to the rate of fluid flow measured by said meter and said register having a shaft which rotates at a speed proportional to the quantity of fluid being recorded by said register, the improvement comprising:
first means responsive to the speed of rotation of said meter shaft for providing a first signal,
second means responsive to the speed of rotation of said register shaft for providing a second signal,
third means responsive to said first and second signals for effecting a control signal when said first signal exceeds said second signal by at least a predetermined amount,
cutoff valve means connected in said fluid line, and
means responsive to said control signal for operating said cutoff valve means to interrupt the flow of fluid in said line.

2. The invention set forth in claim 1 wherein:
said first means includes a first cam member and means for rotating said cam member at a speed approximately proportional to the speed of said meter shaft,
said second means includes a second cam member driven directly by said register shaft,
means resiliently urging said cam members into mutually operative engagement, and
said third means is responsive to axial displacement of one of said cam members.

3. The invention set forth in claim 2 wherein said second means comprises:
an over-running clutch providing a drive connection between said meter shaft and said first cam member.

4. The invention set forth in claim 1 further comprising:
means for maintaining said cutoff valve means operative to maintain said fluid flow interrupted after occurrence of said control signal,
reset means for opening said cutoff valve means, and
means for providing a permanent indication whenever said reset means is operated.

5. A comparator device comprising:
a housing,
a first shaft journaled in said housing for connection between the output shaft of a positive displacement meter and a counter,
a first ratchet wheel secured on said shaft within said housing,
a second ratchet wheel freely rotatable on said shaft and positioned adjacent said first ratchet wheel,
a drive connection including an over-running clutch connected between said meter shaft and said second ratchet wheel,
said wheels having respectively tapered opposing face portions,
spring means urging said ratchet wheels into mutual engagement,
switch means mounted on said housing to be actuated by said second ratchet wheel upon a predetermined axial displacement of said second ratchet wheel along said shaft, and reset means for manually rotating said second ratchet wheel relative to said first ratchet wheel.

6. The invention set forth in claim 5 wherein:

said drive connection includes a speed reduction mechanism for causing said second ratchet wheel to be rotated at a speed slower than that of said first shaft.

7. The invention set forth in claim 6 further comprising:

a speed adjuster connected between said first shaft and the output shaft of said meter.

8. A liquid dispensing system comprising a dispensing line having a meter and a control valve connected in series therein, a counter driven by said meter, and a comparator according to claim 5 wherein said first shaft thereof is connected between said meter and said counter and a control solenoid for said control valve is connected in series with said switch means.

References Cited

UNITED STATES PATENTS

| | | | |
|---|---|---|---|
| 637,672 | 11/1899 | Scholz | 73—275 X |
| 932,502 | 8/1909 | Sitts | 73—275 X |
| 1,688,474 | 10/1928 | Slye. | |
| 2,522,845 | 9/1950 | Stevens | 235—94 |

RICHARD C. QUEISSER, *Primary Examiner.*

E. D. GILHOOLY, *Assistant Examiner.*

U.S. Cl. X.R.

73—275